United States Patent
Sobel et al.

(10) Patent No.: US 7,283,663 B2
(45) Date of Patent: Oct. 16, 2007

(54) INTERPOLATION OF EDGE PORTIONS OF A DIGITAL IMAGE

(75) Inventors: Arthur Sobel, Los Altos Hills, CA (US); Todd S. Sachs, Menlo Park, CA (US)

(73) Assignee: Micron Technology, Inc., Boise, ID (US)

( * ) Notice: Subject to any disclaimer, the term of this patent is extended or adjusted under 35 U.S.C. 154(b) by 817 days.

(21) Appl. No.: 10/763,608

(22) Filed: Jan. 23, 2004

(65) Prior Publication Data

US 2004/0150734 A1    Aug. 5, 2004

Related U.S. Application Data

(62) Division of application No. 09/615,963, filed on Jul. 14, 2000, now Pat. No. 6,707,937.

(51) Int. Cl.
*G06K 9/00* (2006.01)
(52) U.S. Cl. .................................................. 382/162
(58) Field of Classification Search ........ 382/162–167, 382/298–301, 173, 239, 305, 240; 348/272–273, 348/581–582, 222.1; 345/589–613, 545–556; 358/1.9, 1.2, 2.1, 1.16, 525, 528, 451, 453
See application file for complete search history.

(56) References Cited

U.S. PATENT DOCUMENTS 5,373,322 A * 12/1994 Laroche et al. ............. 348/273
6,300,935 B1 * 10/2001 Sobel et al. ................. 345/589
6,614,553 B2 * 9/2003 Nakami et al. .............. 358/1.2
6,707,937 B1 * 3/2004 Sobel et al. ................. 382/162
6,782,143 B1 * 8/2004 Dube et al. .................. 382/300
7,088,392 B2 * 8/2006 Kakarala et al. ............ 348/272
7,120,305 B2 * 10/2006 Berkner ....................... 382/240

* cited by examiner

*Primary Examiner*—Ishrat Sherali
(74) *Attorney, Agent, or Firm*—RatnerPrestia

(57) ABSTRACT

A method and apparatus for interpolating color image information are provided. One or more image data values for a portion of a digital image in a vicinity of a target pixel are received and stored in a local array. A processor determines whether there is an edge in the vicinity of the target pixel based on the data values in the local array. If there is not an edge in the vicinity of the target pixel, then long scale interpolation is performed on the image data values in the local array, in order to result in interpolating color information that is missing from the image. If there is an edge in the vicinity of the target pixel, then short scale interpolation is performed using image data values in a subset of the local array in a closer vicinity of the target pixel. As a result, accurate color rendering of a digital image is achieved, even in the presence of an edge portion that exhibits great contrast between regions of the image.

18 Claims, 13 Drawing Sheets

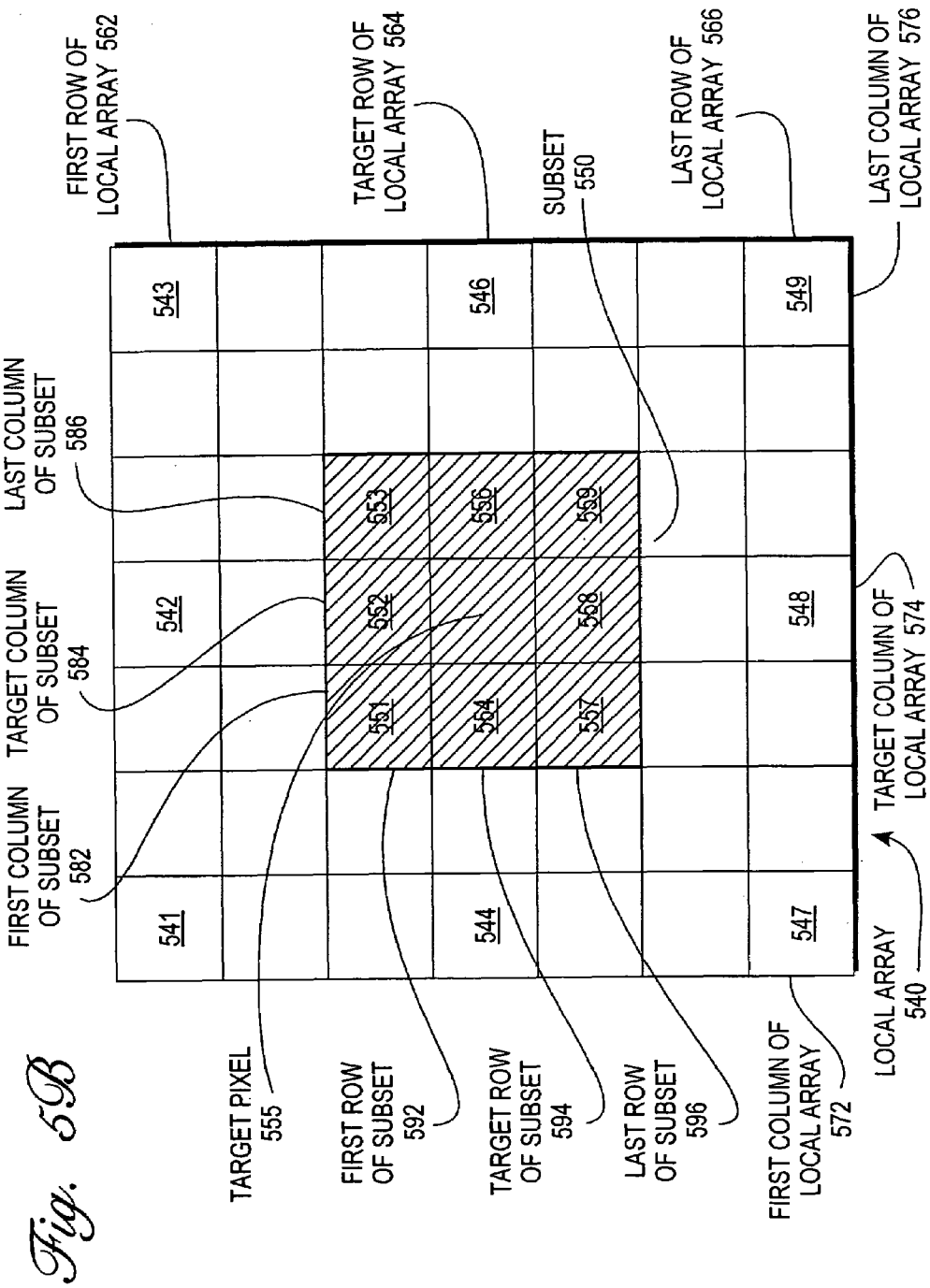

INTERPOLATION OF EDGE PORTIONS OF A DIGITAL IMAGE

This is a Divisional of application Ser. No. 09/615,963, filed on Jul. 14, 2000 now U.S. Pat. No. 6,707,937, the entire disclosure of which is incorporated herein by reference.

FIELD OF THE INVENTION

The present invention generally relates to computer-based digital image processing. The invention relates more specifically to methods and electronic circuits useful in interpolating edge portions of a digital image.

BACKGROUND OF THE INVENTION

Color display devices are used by many computers and by computer-related devices such as digital cameras. These displays generally comprise a two-dimensional matrix of display elements or pixels. Each pixel comprises a Red ("R"), Green ("G"), and Blue ("B") cell. Each pixel of the display device is represented by a corresponding memory cell that may store a numeric value. The memory cell values usually are 8, 10, or 12 bits in size, and may be stored in any other convenient size. A computer program may cause a particular pixel to glow in any visible color, or to appear black or white, by setting the numeric values of its red, green, and blue cells to an appropriate value.

In many products and applications, some of the pixel information is computer-generated or "interpolated" by a computer processor or CPU based on other information. Within the general field of computer graphics displays, there is an acute need to improve the way that displays generate or interpolate missing color information. In products that use display devices that are driven by a sensor, there is a particular need to improve the methods and mechanisms that are used to generate interpolated color information.

The following description will focus on particular problems encountered with digital cameras that use CCD sensors to receive light and form a digital picture for display by a color LCD display of the camera. However, the problems described herein occur in many other contexts, and the solutions described herein are applicable to such contexts. For example, the problems and solutions described herein are applicable to all color area sensors that use a two-dimensional array of sensing elements.

Generally, when a digital camera CPU receives image information from the camera sensor, each pixel provided by the sensor represents only one optical color, usually Red, Blue, or Green. The pixels arrive at the CPU in a pattern, which corresponds to the physical placement of sensing elements in the sensor. In one pattern, a first line of the sensor has alternating Red and Green pixels, and the next line has alternating Green and Blue pixels. The pattern continues for the entire CCD sensor, which has a checkerboard or mosaic pattern.

FIG. 5A is a block diagram of a 7-by-7 portion 500 of sensor elements 502, 504, 506 illustrating one pattern that is used by some CCD sensors. A first line 510 of portion 500 comprises a first Red pixel 502a, a first Green pixel 504a, a second Red pixel 502b, a second Green pixel 504b, and so on in an alternating pattern. Second line 512 or portion 500 has a first Green pixel 504c, a first Blue pixel 506a, a second Green pixel 504d, a second Blue pixel 506b, and so forth. This two-line pattern is repeated across the entire surface of the sensor. When the sensor delivers pixel information to a CPU or other element, the information arrives in the same pattern.

Each pixel value may be an 8-bit quantity, 10-bit quantity, 12-bit quantity, or a numeric quantity of some other size. For convenience, in FIG. 5 each pixel is labeled with a numeral from 11 to 77 that identifies its relative position in the 7-by-7 portion 500.

In the foregoing pattern, there are twice as many Green pixels as there are Blue pixels or Red pixels. This is done because the human eye has been found to perceive Green as the most important color in an image, and also because the semiconductor materials that are used to form the sensors are less sensitive to light of Green wavelengths.

The pixel information received using this checkerboard pattern, however, cannot be directly displayed on a graphic display device. An image may be produced only by adding further pixel information to the received pattern of pixel data. Each element of the display comprises the combination of a Red, Green, and Blue pixel and corresponding pixel values, however, each element of the sensor represents only one of the three colors. Thus, two additional complementary color values must be generated and stored in association with the single color value received from the sensor.

For example, in the first line of the portion 500 of FIG. 5, for the first Red pixel 502a, Green and Blue color values must be created and stored. For the next pixel, which is Green pixel 504a, a Red value and a Blue value must be created and stored. This process is called "color interpolation" and must be rapidly carried out for every pixel value that is received from the sensor. An image may be displayed only after the interpolation step is complete.

Several past approaches are known for carrying out color interpolation. For example, bilinear interpolation involves an averaging approach. At each Blue pixel, to interpolate the Green value, the surrounding four (4) Green values actually received from the sensor are obtained, and their arithmetic mean is computed. The mean value becomes the interpolated Green value. This approach is simple, but relatively inaccurate in terms of color fidelity and image appearance.

A more accurate prior approach is bicubic color interpolation. Bicubic interpolation is similar to bilinear interpolation, but involves using more neighboring pixels and applying a computation that is more complex than averaging.

In one approach, the computation considers a 7-by-7 matrix of pixels, in which the target pixel for which interpolation is carried out lies at the center of the matrix, and the computation considers three (3) neighbor pixels in each linear direction. For example, the matrix of FIG. 5 may be used. In this example, Blue pixel 41 is the center pixel for which interpolation is carried out and all other pixels illustrated in FIG. 5 are neighbors. In this approach, a corresponding matrix of coefficient values is defined and stored. Each coefficient has a floating-point value between "0" and "1". Each coefficient value is defined by a nonlinear curve that reflects the relative contribution of each neighbor pixel to the complementary color values of the center pixel. Each coefficient value of all neighbor pixels of a particular color is multiplied by the value of the center pixel, then all the products are summed, and then the arithmetic mean of the products is taken. The result is the pixel value for that particular color.

Other past approaches are described in J. A. Parker et al., "Comparison of Interpolating Methods for Image Resampling," MI-2 IEEE Transactions on Medical Imaging 31 (Mar. 1983).

Another method for interpolating missing color information is described in co-pending U.S. application Ser. No. 09/295,727, filed Apr. 20, 1999 by Sobel et al. ("Sobel"). In general, Sobel discloses an improved approach for carrying out color interpolation computations for digital images within the computation horsepower available in a digital camera. As described in Sobel, a typical CCD camera sensor comprises an array of CCD sensors arranged in rows and columns. Between each column of CCDs there is a vertical shift register. At the bottom of all the columns is a horizontal shift register. When an image is formed by opening the shutter of the camera, each sensor in the array, which represents a pixel, is exposed for a length of time that is determined by a sensor controller. Then, information produced by all the sensors is transferred to the vertical shift registers. The information is then transferred, one pixel value at a time, to the horizontal shift register. The first pixel that is transferred corresponds to the upper left part of picture.

Thus, serial data is delivered from the sensor to a CPU, or to another hardware device such as photo processor 208 shown in FIG. 2. The CPU or other hardware device "sees" a line of pixel data comprising a Red value, Green value, Red value, Green value, and so forth. The next line of pixel data comprises alternating Green and Blue values. Generally, the lines are 1024 to 3000 pixels long, and the pixel data is delivered by the sensor at about 20 MHz.

Using the techniques of Sobel, a register array automatically holds data values for pixels in a predetermined vicinity of the target pixel, e.g., in a 7×7 matrix array, while the values in other pixels of the image are either in the shift registers or non-volatile memory of the device. This arrangement saves the time of performing a random access retrieval from memory or non-volatile storage. This may be a substantial savings for a digital camera with limited computational resources. Before the CPU or other device may carry out interpolation on the pixel data, the CPU corrects for any errors in each pixel value. For example, the CPU may carry out photo-response non-uniformity (PRNU) correction. PRNU correction generally involves multiplying pixel data that corresponds to a particular color by a correction factor or co-efficient that corrects for non-uniformity of the color filters of the CCD for that particular color. For example, it is known that certain semiconductor materials, from which the sensors are made, are more sensitive to red light than to blue light. PRNU correction adjusts for this variance in sensitivity.

After PRNU correction, a stream of corrected pixel data arrives at the CPU or other hardware device. The CPU may transfer the values to a memory, such as a high-performance SDRAM. The CPU may then begin carrying out interpolation of the missing color information. For example, the CPU may apply bicubic color interpolation using 7-by-7 blocks of memory.

Unfortunately, these interpolation approaches generally produce acceptable interpolated results only when neighboring pixels of the value being interpolated are relatively consistent in color compared to the missing color information. This is generally true in most regions of an original image that have relatively gradual changes in color from pixel to pixel. However, images that include sharp edges present a problem.

In a portion of an image that represents the edge of an object, color changes may be extreme from one pixel to the next. For example, consider an original image comprising a dark object viewed in front of a light background; sharp color changes occur at the edge of an object. Further consider an image of a light colored human face against a dark background (or the converse). The cheek portion of the face in the image may have relatively consistent coloration, but at the edge of the cheek there may be a transition ("fall-off") from light to dark. Some changes may occur within one pixel worth of information, i.e., it is possible that an image will transition from a black color value (one extreme) to a white color value (another extreme), and vice versa. In this context, an "edge" of an image refers to any region of sharp color contrast in an image, not necessarily the physical edge or outermost pixels of the image. When determining the appropriate color values of an edge of an image, current interpolation approaches may use some data from one side of the edge and some data from the other side of the edge to derive the missing color information. If an interpolation approach is used for an image with an abrupt edge portion or transition region, at some point the interpolator must consider and resolve pixel values at the edge portion or for the transition region. If an abrupt color change occurs within fewer pixels than the interpolation process considers within one (1) iteration of interpolation, for example, in fewer than seven (7) pixels for an interpolation process that uses a 7×7 matrix, then the interpolation process will produce colors that do not really reflect the true color of the region of change.

Accordingly, severe color error may result, because the interpolated color is not a color that was part of the original image. Also because the values on each side of the edge may vary significantly, fuzziness, shimmering, or other undesirable effects may occur in an interpolated edge portion of an image.

Such problems become acute when bicubic interpolation approaches are used. Use of a 7×7 matrix for evaluation means that the values used in the interpolation will extend out three (3) values on each side of the edge. Accordingly, using three (3) values from the wrong side of the edge means that the final interpolated value is potentially more heavily weighted with incorrect color values.

Thus, there is a need for an improved method for interpolating color information in a digital image at a location in an image where abrupt color changes occur.

In the field of digital cameras, there is a particular need for an improved method and apparatus for interpolating color information at edge portions or color transition regions of digital images that are formed by the cameras using the limited computational resources of the digital camera.

SUMMARY OF THE INVENTION

The foregoing needs, and other needs and objects that will become apparent from the following description, are achieved by the present invention, which comprises, in one aspect, a method of interpolating image values that selectively elects to carry out a bicubic interpolation of an image region or a directed linear interpolation of a subset of the image region, according to whether the image region contains an edge. In one embodiment, an edge detection test is performed for each new pixel that is received using data in the image region in the vicinity of the pixel. When edge detection is positive, then a directed linear interpolation process is carried out for the corresponding pixel using data in a subset of the image region, thereby minimizing color error. When edge detection is negative, bicubic interpolation is carried out.

In a preferred embodiment, before a color value is interpolated, a 7×7 matrix of pixels is considered for edge detection. If an edge is identified within the matrix, or if a region is otherwise determined to be an edge, bicubic interpolation is not performed. Rather, a linear interpolation approach is applied to a 3×3 matrix subset of the 7×7 matrix of pixels usually used for interpolation, and the pixels in such a subset matrix are selected from only the correct side of the edge.

In one aspect, a method and apparatus for interpolating color image information are provided. One or more image data values for a portion of a digital image in a vicinity of a target pixel are received and stored in a local array. A processor determines whether there is an edge in the vicinity of the target pixel based on the data values in the local array. If there is not an edge in the vicinity of the target pixel, then long scale interpolation is performed on the image data values in the local array, in order to result in interpolating color information that is missing from the image. If there is an edge in the vicinity of the target pixel, then short scale interpolation is performed using image data values in a subset of the local array in a closer vicinity of the target pixel. As a result, accurate color rendering of a digital image is achieved, even in the presence of an edge portion that exhibits great contrast between regions of the image.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5B is a diagram that schematically illustrates a local array of image data values and a subset of the local array;

DETAILED DESCRIPTION OF THE PREFERRED EMBODIMENT

A method and apparatus for interpolating image information at the edge of an image is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Digital Camera Architecture

Figure 1:
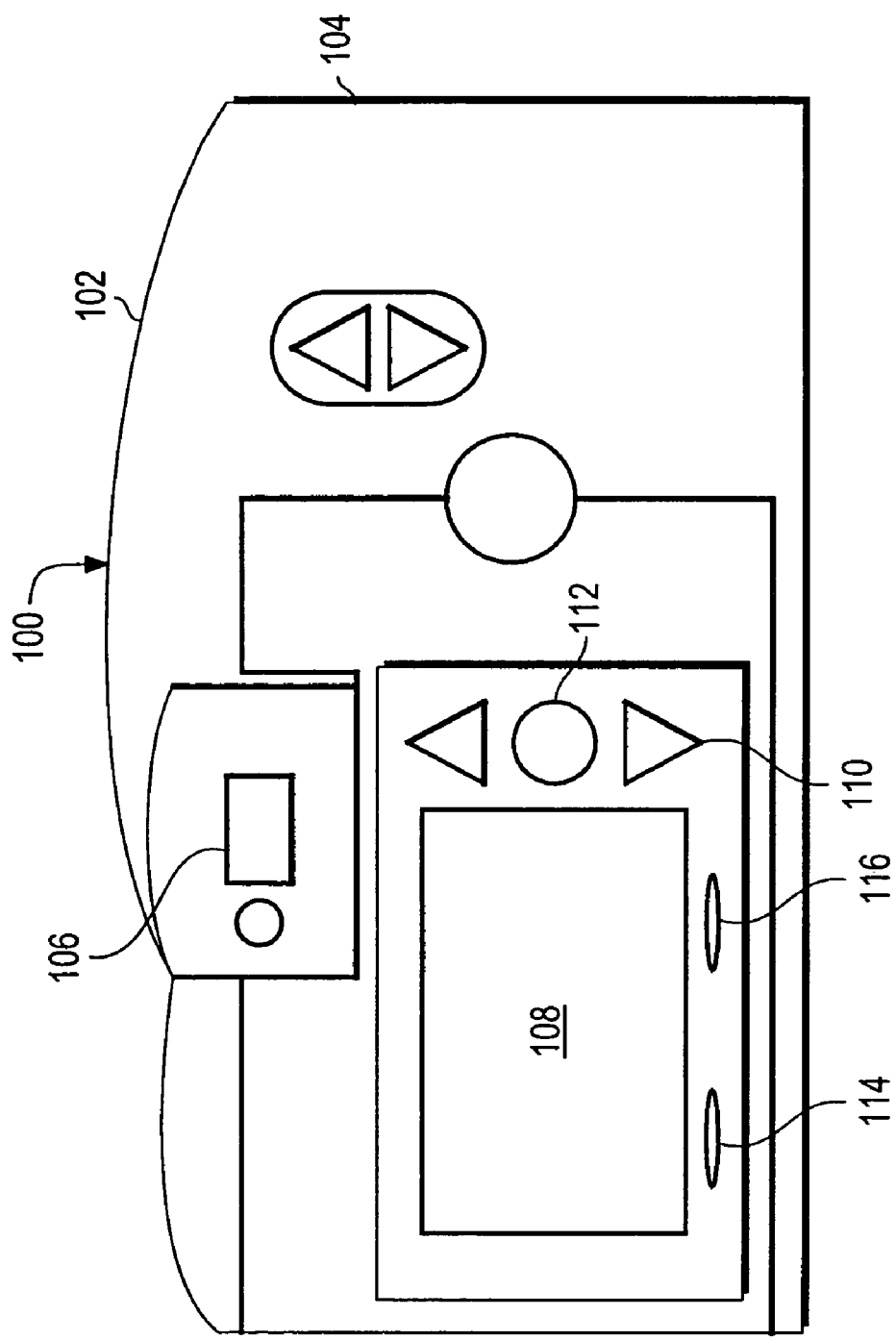
FIG. 1 is a rear elevation view of a personal handheld digital camera.

FIG. 1 is a rear elevation view of a personal handheld digital camera 100. The camera 100 comprises a body 102 generally formed as a rectangular box that can be gripped in the hand using a handgrip 104. A viewfinder 106 is optically coupled to a main lens, so that a user of the camera who wishes to take a picture can look through the viewfinder 106 to line up the shot.

A display device 108 is mounted in the body 102. Stored images and camera settings may be viewed on the display device 108. In one embodiment the display device 108 is a liquid crystal display (LCD) having a visible area that is approximately 2" (5 cm) in the diagonal dimension. Selection buttons 110, 112, 114, 116 are mounted in the body 102 adjacent to the display 108. The selection buttons 110-116 are used to signal various logical selections of options, commands, etc. based on the contents of the display 108. Use of the buttons 110-116 in the context of transporting digital images is described further below.

Figure 2:
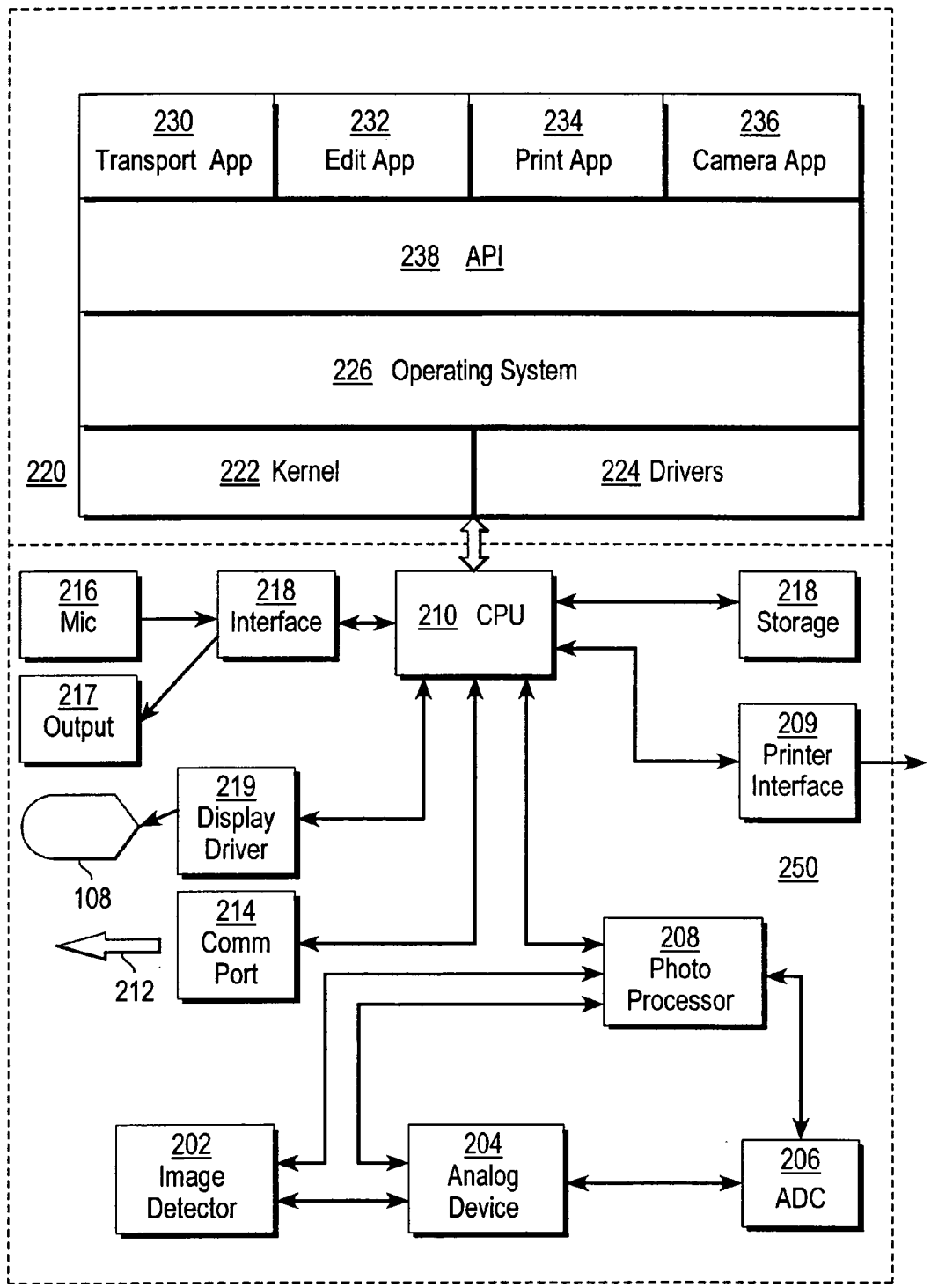
FIG. 2 is a block diagram of selected physical and logical components of a digital camera.

FIG. 2 is a block diagram of selected physical and logical components of the digital camera 100 according to an embodiment. Architecture 200 of the digital camera 100 comprises certain software elements 220 and hardware elements 250. Among the hardware elements 250, an image detector 202 is optically coupled to a main lens of the camera 100. As in a conventional camera, a shutter is interposed between the main lens and the image detector 202. When the shutter is opened, the image detector 202 receives light reflected from a subject and focused by the lens, and an image is formed at the image detector. An example of an image detector 202 is a charge-coupled device (CCD) that comprises an array of detectors or elements.

The image detector 202 produces a plurality of analog image signals that are generally proportional to the amount of light falling on the elements of the CCD. The analog, image signals are coupled to an analog device 204, also called an analog chip or photo color device. The analog device 204 receives the signals from the CCD and organizes them into a discrete set of analog signals in a pre-determined amount. The analog device is coupled to an analog-digital converter (ADC) 206 that receives the analog signals from the analog device 204, and converts the analog signals into a plurality of digital signals. In preferred embodiments, the ADC 206 carries out 8-bit or 12-bit analog-to-digital conversion.

The ADC 206 provides its digital outputs to a photo processor 208. In a preferred embodiment, photo processor 208 is implemented as an application specific integrated circuit (ASIC) device that controls operational parameters of the image detector 202 and the analog device 204. The photo processor 208 may also buffer or groom the digital signals received from the ADC 206 to improve or modify image quality.

The photo processor 208 is coupled to a central processing unit (CPU) 210, which in one embodiment is a microprocessor having a 100 MHz clock cycle. The CPU 210 provides central control for other hardware elements 250 of the architecture 200 and executes software elements 220, as described below. The CPU 210 is coupled to one or more storage devices 212. For example, the CPU 210 is coupled to a flash memory card that provides non-volatile storage of digital images or photos taken by the digital camera.

The CPU is also coupled to input/output devices such as a communications port 214. For example, the CPU 210 is coupled to a telephone line 212 through a modem comprised of a coder/decoder (codec) and digital to analog adapter (DAA). Using the modem, the CPU 210 can communicate data over a conventional telephone line to a remote device such as a server, personal computer or workstation, or printer. A modem is merely one example of a device suitable for use as communications port 214. Alternatively, the communications port 214 is an infrared communications device, an Ethernet interface, an ISDN terminal adapter, or another telecommunications device. The specific communication method, protocol or mode used by communications port 214 is not critical.

In the preferred embodiment, CPU 210 also is coupled to a microphone 216 through an appropriate interface 218. Preferably, the microphone 216 is mounted in or on the body 102 of the camera 100. The interface 218 converts analog voice signals received from the microphone 216 into a digital signal representative of the voice signals. The interface 218 enables the CPU 210 to receive, use and manipulate voice commands or voice message information spoken by a user of the digital camera into the microphone 216. The interface 218 preferably is also coupled to an output device 217. The interface can receive digitized audio information, convert it to analog form, pre-amplify the resulting analog signal, and drive the output device 217. In combination, the interface 218 and output device 217 enable the CPU 210 to play digitized audio files or voice messages in an audible way. The output device 217 is a loudspeaker, or an output connector or jack that can be connected to an amplifier and speaker or to a pair of headphones.

The CPU 210 is also coupled to the display device 108 through a display driver 219. The CPU 210 communicates, to the display driver 219, the form and content of information to be displayed on the display device 108. The display driver 219 determines how to display the information and drives the display device 108, for example, by causing the display device 108 to illuminate pixels of an LCD array at appropriate points. In the preferred embodiment, the display device 108 has a touch screen formed integrally with the display. In this embodiment, the display driver also includes circuitry or firmware for receiving signals from the touch screen that represent user selection of elements shown in the display. Alternatively, a separate touch screen driver circuit or chip is used.

In one embodiment, CPU 210 is also coupled to a printer interface 209 that connects to an external image-quality printer. Using printer interface 209, under program control, CPU 210 can command the printer to print a tangible copy of a stored photo. In the preferred embodiment, printer interface 209 communicates data to the printer using infrared light signals. Of course, any other type of printer interface can be used.

In another alternative embodiment, the CPU 210 is coupled to a hot-pluggable external interface. The hot-pluggable external interface enables the digital camera 100 to be connected to a docking station whereby the digital camera may communicate data and images to external computing devices, such as a personal computer.

The CPU 210 executes software elements 220. In the preferred embodiment, the software elements 220 of the architecture 200 are arranged in several logical levels. At the lowest logical level, the CPU 210 executes a kernel 222 and one or more drivers 224, which cooperate to control and supervise the hardware elements 250. For example, the drivers 224 include a driver program that controls and supervises operation of the image detector 202, the analog device 204, and the photo processor 208.

The CPU 210 executes an operating system 226. The operating system 226 is arranged at a logic level higher than the kernel 222 and drivers 224, so that the operating system 226 can use services embodied in the kernel and drivers. In certain embodiments, the operating system 226 may be the VXworks operating system from WindRiver, or the Microsoft Windows CE operating system.

An application program interface (API) 228 is logically interposed between the operating system 226 and one or more application programs 230-236. The API 228 provides an application program interface (API) so that the application programs 230-236 may use services of the operating system 226, kernel 222 and drivers 224 by calling functions organized according to high-level abstractions. In this configuration, the application programs 230-236 are insulated from implementation details or intricacies of the operating system 226, kernel 222 and drivers 224. In the preferred embodiment, the API 228 provides functions accessible through function calls that express abstract program behavior and simplify application program development. For example, the API 228 provides functions for retrieving images, storing images, manipulating image elements, receiving or outputting information, and other functions.

In the preferred embodiment, the CPU 210 executes a transport application 230, an edit application 232, a print application 234, and a camera control application 236. Generally, the transport application 230 provides image transport functions, enabling a user of the digital camera 100 to send one or more stored pictures or images from the camera to one or more external addresses. The edit application 232 provides image editing, functions, enabling a user of the digital camera 100 to edit, retouch, or alter one or more stored pictures or images while they are stored in the camera. The print application 234 provides image-printing functions, enabling a user of the digital camera 100 to print one or more stored images directly from the camera to a printer. The camera control application 236 provides camera control functions, enabling a user of the digital camera 100 to adjust settings of the camera, such as the exposure time, flash on/off, zoom, whether manual focus or auto-focus is enabled, red eye removal, flash fill, exposure intensity, etc. In alternate embodiments, other application programs are executed.

In alternative embodiments, the software elements 220 are implemented in the form of firmware or hardwired circuitry that carries out the functions described herein. Implementation in software in this arrangement is not required. Preferably, a user of the digital camera 100 selects and activates one of the application programs 230-236 by choosing an icon representing the desired application program from a display shown on the display device 108.

Edge Detection and Interpolation Method

An overview of edge detection and interpolation methods is now provided in relation to FIG. 5B.

Figure 5A:
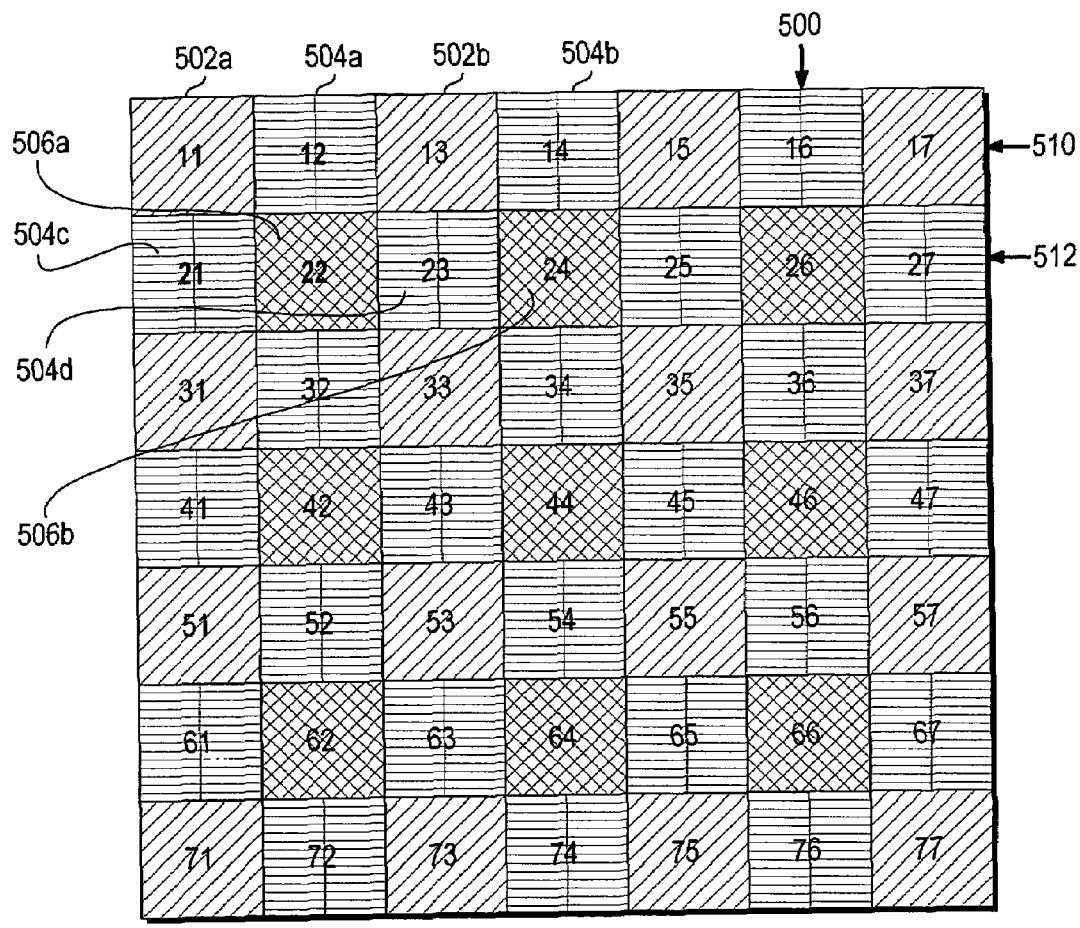
FIG. 5A is a diagram that schematically illustrates a color pixel pattern of an example sensor device.

FIG. 5B is a diagram that schematically illustrates a local array 540 of image data values and a subset 550 of the local array according to an exemplary embodiment. Unlike FIG. 5A which shows one specific arrangement of pixels, when the center pixel is a red pixel, FIG. 5B does not specify which color occupies which pixel. FIG. 5B shows a local array 540 of pixels in the vicinity of a target pixel 555 in an embodiment in which the target pixel is at the center of the local array and the vicinity includes all pixels a distance of three pixels or less from the target pixel, vertically, horizontally, and diagonally. In this case, the local array 540 is a 7×7 array of image data values. The local array 540 represents the portion of image data that is conventionally used in color interpolation for the target pixel 555. Because this portion of the image is conventionally used, it is assumed to be readily available. For example, the apparatus of Sobel efficiently provides data for the local array 540 in the register array that is automatically updated without time consuming, random-access retrievals from a memory device.

Within the local array 540 is a subset array 550 of pixels. In the embodiment of FIG. 5B, the subset 550 includes the target pixel 555 and all pixels in a closer vicinity of the target 555, i.e., within a distance of one or less from the target pixel 555, vertically, horizontally, and diagonally.

Figure 6A:
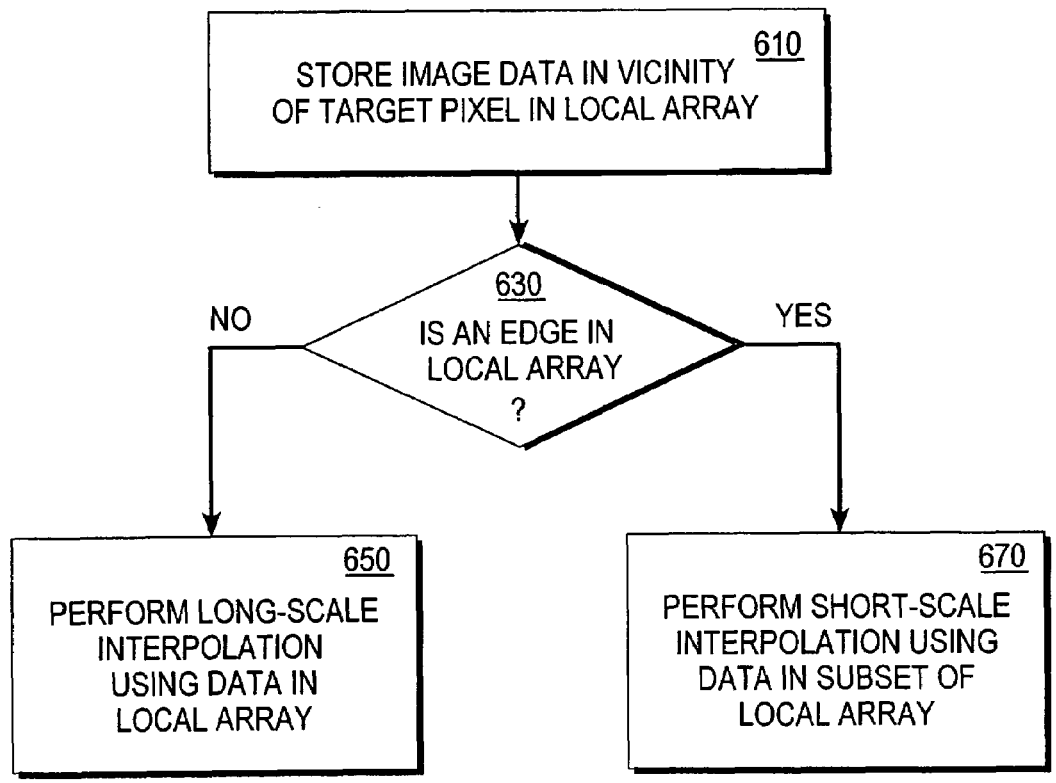
FIG. 6A, FIG. 6B, FIG. 6C, FIG. 6D, FIG. 6E, FIG. 6F are flow diagrams of a process of detecting edges in an image and interpolating color information of pixels located at edges based on color information of neighbor pixels.

FIG. 6A is a flow diagram showing the relationship of edge detection and color interpolation. In step 610 image data in the vicinity of the target pixel is stored in a local array, such as in the register array of the apparatus of Sobel. In step 630, the data in the local array is used to determine whether an edge is present. This involves the use of an edge detector as will be described further below. If an edge is not detected in step 630, then, in step 650, conventional color interpolation is applied using the data in the local array. Since conventional color interpolation uses data from any location in the local array, this type of color interpolation is called herein "long-scale" interpolation. For example, in one embodiment, bi-cubic interpolation is performed according to the apparatus of Sobel which uses the data in a 7×7 register array as input to dot product circuits that are specific to the color of the target pixel and the second color being interpolated to the target pixel.

If an edge is detected in step 630, then, in step 670, color interpolation is performed using only data in the subset array of the local array. Since this color interpolation uses data only from the smaller vicinity of the target in the subset array, this type of color interpolation is called herein "short-scale" interpolation. For example, in one embodiment, linear interpolation is performed. For example, in another embodiment, directed linear interpolation is performed. Directed linear interpolation is described in more detail below.

Edge Detection

In one embodiment, an edge is detected in image data as a large change in the data values of one or more colors in the pixels in the local array. A change may be considered large if it exceeds some threshold value. A reasonable threshold is selected as a large percentage of the total range of values associated with each color. In an 8-bit pixel, this range is 0 to 255, where 255 is the peak pixel value. In a 12-bit pixel, this range is 0 to 4095, where 4095 is the peak pixel value.

A change is computed for a local array by taking the absolute value of the difference between the data values of two pixels of the same color. The absolute value of the difference is computed to convert negative differences to positive differences. If the two pixels differenced are represented by P1 and P2, and the absolute value of a difference is represented by Δ, then by definition $$\Delta 1 = |P2 - P1| \qquad (1)$$

For example, referring to FIG. 5B, P1 is taken from pixel 541 in one corner of the local array, and P2 is taken from pixel 549 in the opposite corner of the local array. If an edge occurs between these two pixels, then Δ1 would be a large percentage of the peak pixel value, say 10%, or more. If 8-bit pixels are used for the local array, then the peak value is 255 and ten percent is about 26. Thus if P1 has a value 26 greater than the value of P2, or if P1 has a value 26 less than P2, then an edge would be detected.

P1 and P2 should both be pixels of the same color, red, green or blue. This is because the values of one color can be very far from the values of another color even where there is no edge. For example, if the portion of the image represented by the local array is uniformly purple, all the green pixels would have values near zero, and both red and blue pixels would have the similar values, say 150 and 145. Since the area is uniformly purple, then there should be no edge detected. Yet, if P1 is a green pixel and P2 is a red pixel, a difference of 145 or more would be computed, causing an edge to be detected.

It is convenient that, with the pattern of pixel colors shown in FIG. 5A, and a local array with an equal number of odd rows and columns, such as 3×3 or 7×7 or 11×11, opposite corners will always be the same color, no matter which of the three colors (red, green or blue) is associated with the pixel that occupies the center.

Even if P1 and P2 are the same color, an edge might occur right along a diagonal line connecting pixels 541 and 549. In this case, the data values at both P1 and P2 may be the same, or closer than 26 apart. To detect an edge in this case, a second difference should be computed using the pair of pixels in the remaining corners, i.e., at pixels 543 and 547.

For similar reasons, one or more additional pairs of pixels from opposite sides of the local array are differenced. For example, pixels 542 and 548 in the same column as the target pixel are differenced in one embodiment, as are pixels 544 and 546 in the same row as the target pixel. With the pattern of alternating pixels shown in FIG. 5A, each of these pairs also automatically includes pixels of the same color. If there is no edge in the vicinity of the target pixel, all these differences will be small.

If the image contains an isolated edge surrounded by more uniform colors, then there may be an edge at the target pixel that is not detected by the differences based on pixels from opposite sides of the local array. Such an edge would still be apparent in differences between pixel pairs taken from opposite sides of the subset array. For a 3×3 subset, the following pairs include pixels of the same color (red, green or blue) no matter which color pixel occupies the target pixel, 551 and 559, 552 and 558, 553 and 557, and 554 and 556.

Figure 6B:
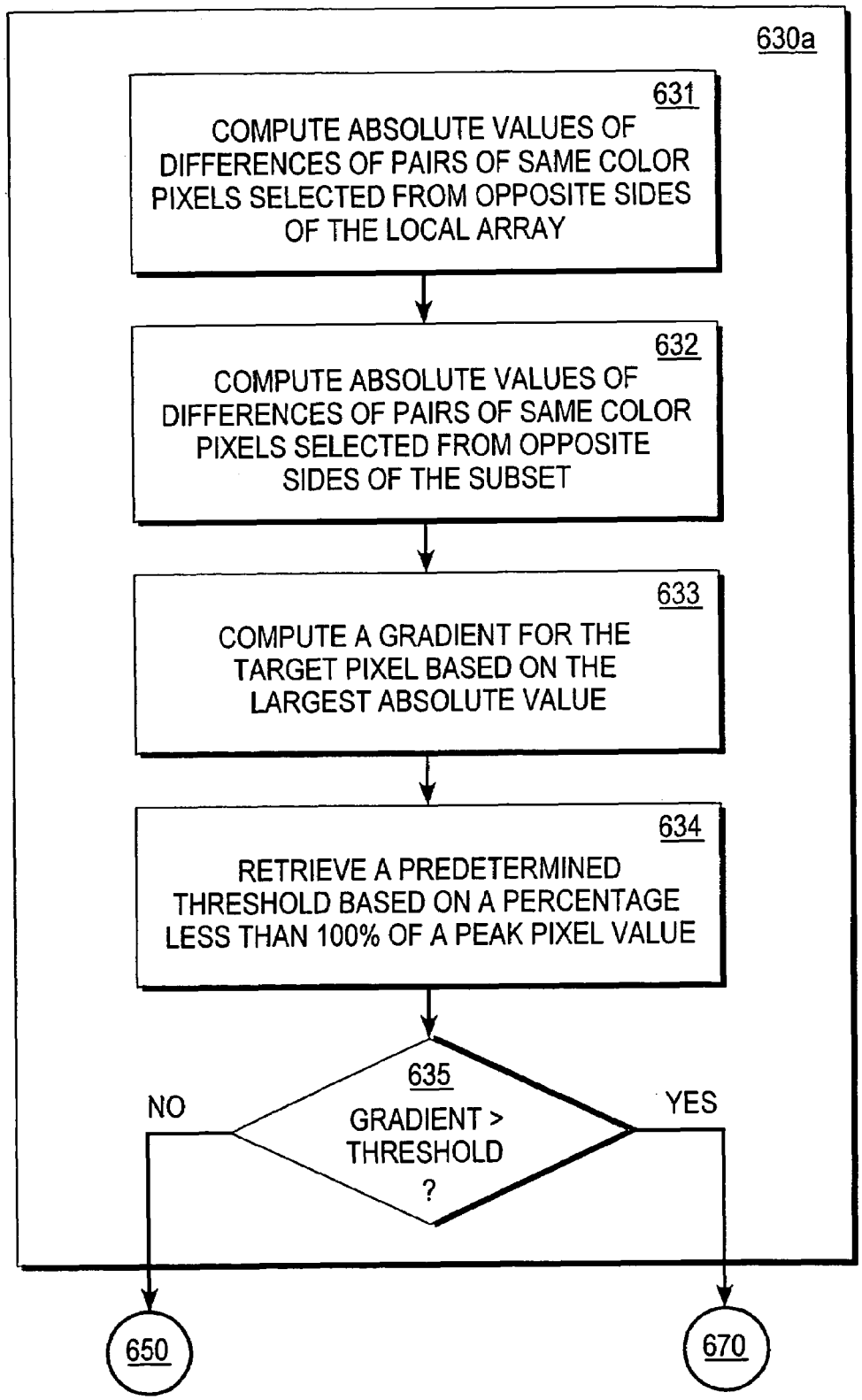

FIG. 6B shows edge detection 630a according to an exemplary embodiment. In step 631 differences are computed in the data values of pairs of pixels of the same color from opposite sides of the local array, and the absolute value of the difference is derived. In step 632 a similar procedure is followed for pixel pairs from opposite sides of the subset.

In step 633 a quantity termed herein the "gradient" is derived from the absolute values. In the preferred embodiment, this gradient is derived by selecting the largest of the absolute values computed. In another embodiment, the absolute values are scaled by the distance between the pixels before the largest value is selected for the gradient. In another embodiment, another quantity based on the absolute values is used as the gradient, such as a quantity based on an average or standard deviation or both, of the absolute values.

In step 634, the method retrieves a predetermined threshold. In the preferred embodiment, the threshold is based on a percentage of the peak pixel value, where the percentage is less than 100% of the peak pixel value. Experience has shown that a percentage of about 5% to about 40% is practical to detect an edge over a local array of 7×7 pixels.

The most satisfactory results are achieved for the experiments performed when the percentage is about 10% to about 20%.

In step 635 the gradient is tested against the threshold. If the gradient exceeds the threshold then the method determines that an edge is present in the vicinity of the target pixel, and control passes to a short-range interpolation scheme, step 670 of FIG. 6A. If the gradient is less than the threshold, then the method determines that an edge is not present in the vicinity of the target pixel, and control passes to the long-range interpolation scheme, step 650 of FIG. 6A. If the gradient equals the threshold, then it is a design choice whether to consider a edge has been detected or not.

Figure 6C:
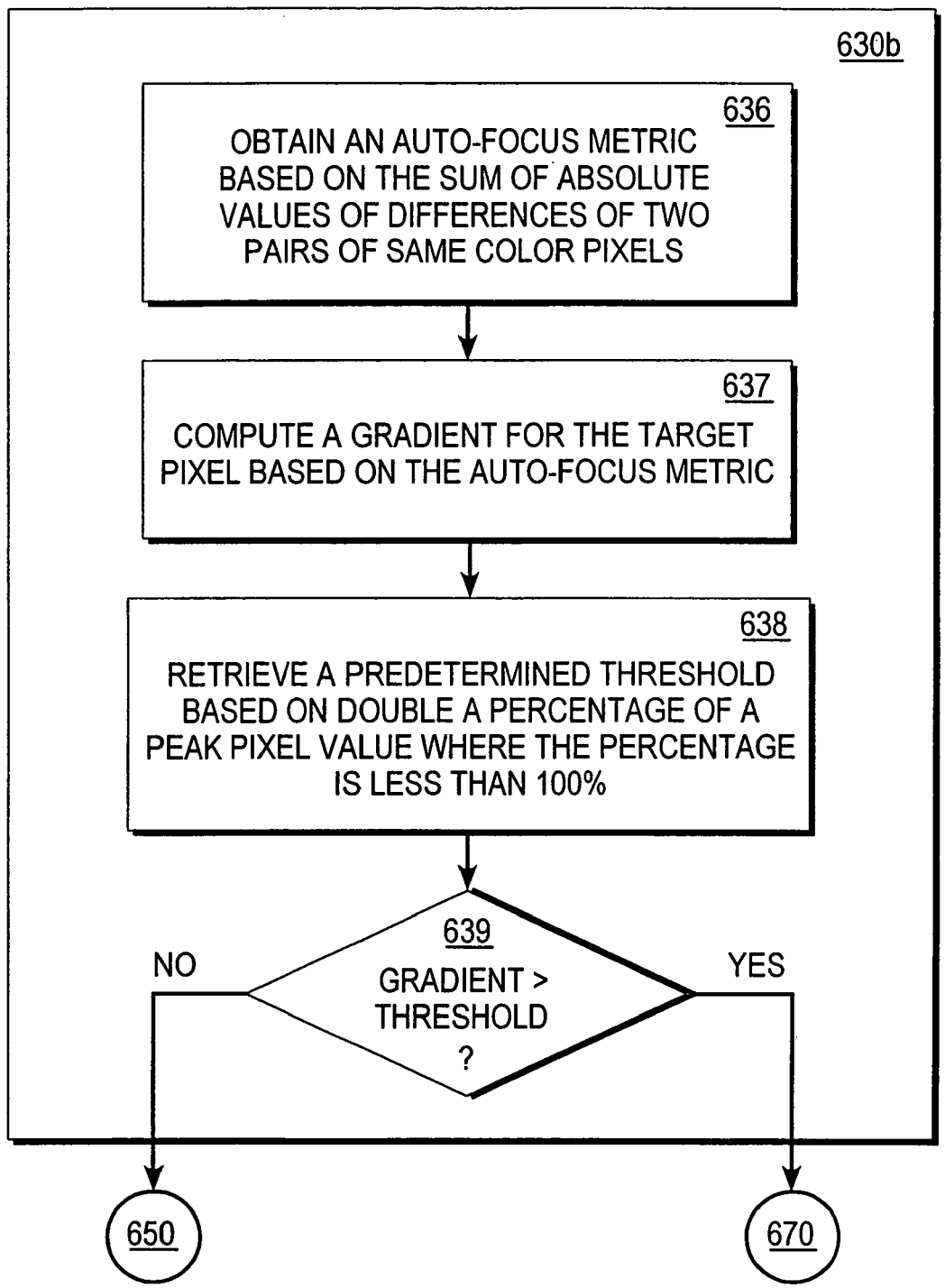

FIG. 6C shows an alternative embodiment 630b of an edge detector 630. In step 836, the process obtains and makes use of an auto-focus metric available in some digital cameras, if the auto-focus metric is based on one or more absolute values of differences of pairs of same colored pixels. In step 637, a gradient is based on the auto-focus metric. For example, in the preferred embodiment, in which the auto-focus metric is the sum of the absolute values of the differences from two pairs of pixels, the gradient is set substantially equal to the auto-focus metric. In step, 638 a threshold is set to twice the value used in embodiment illustrated in FIG. 6B. This is done because the sum of two absolute values can be twice the size of a single absolute value, and it is not desirable to detect twice as many edges for the same image just because the auto-focus metric is used. In another embodiment, a threshold is be set lower than twice the value used in the embodiment of FIG. 6B, because the second absolute value in the sum may be based on a pair of pixels aligned parallel or nearly so with the edge, and so not contribute significantly to the sum.

In step 639, as in step 635 of FIG. 6B, the gradient is tested against the threshold. If the gradient exceeds the threshold then the method determines that an edge is present in the vicinity of the target pixel, and control passes to a short-range interpolation scheme, step 670 of FIG. 6A. If the gradient is less than the threshold, then the method determines that an edge is not present in the vicinity of the target pixel, and control passes to the long-range interpolation scheme, step 650 of FIG. 6A. If the gradient equals the threshold, then it is a design choice whether to consider a edge has been detected or not.

Directed Linear Interpolation

Directed linear interpolation differs from conventional linear interpolation in requiring that certain conditions be satisfied before performing the linear interpolation.

Figure 6D:
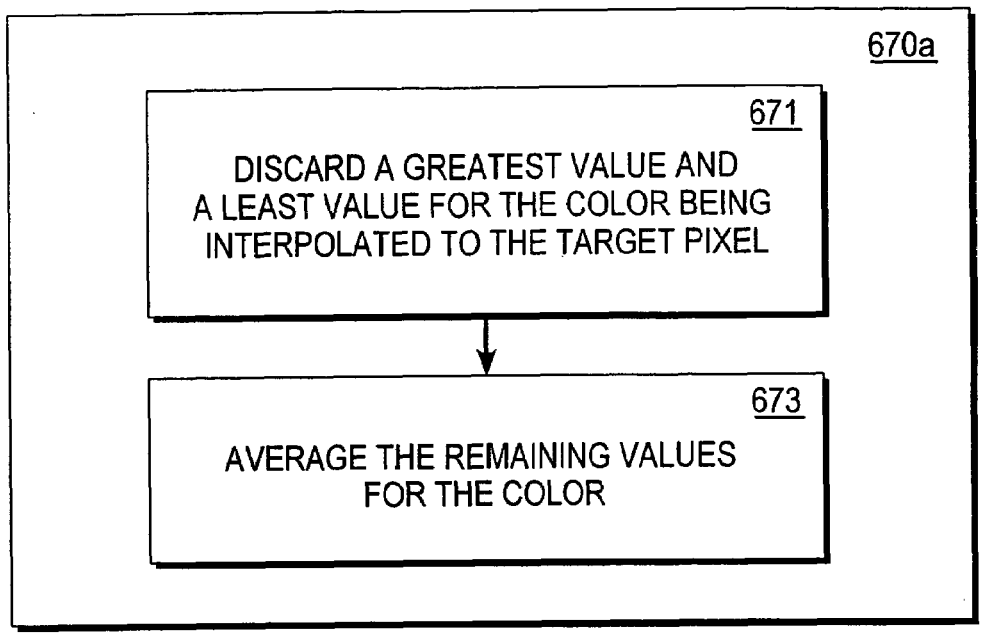

For example, FIG. 6D shows one embodiment 670a of directed linear interpolation that may be used as the short-scale interpolation on the subset array. In step 671, the greatest value and least value of pixels for the color being interpolated are discarded. In step 673, the remaining values for pixels of the color being interpolated are averaged. This method is based on the observation that a pixel from the side of the edge opposite to the side where most of the pixels in the subset lie will always have either the greatest or least value. This method also tosses out one of the pixels on the same side, as the majority of the pixels, but since more than one pixel is on the majority side, at least one pixel on the majority side remains.

This method can only be used for circumstances in which there are three or more values of the color being interpolated. One example is when the pixels exhibit the pattern shown in FIG. 5A, and green values are being interpolated to a target pixel that is red or blue, as described in more detail below.

Figure 6E:
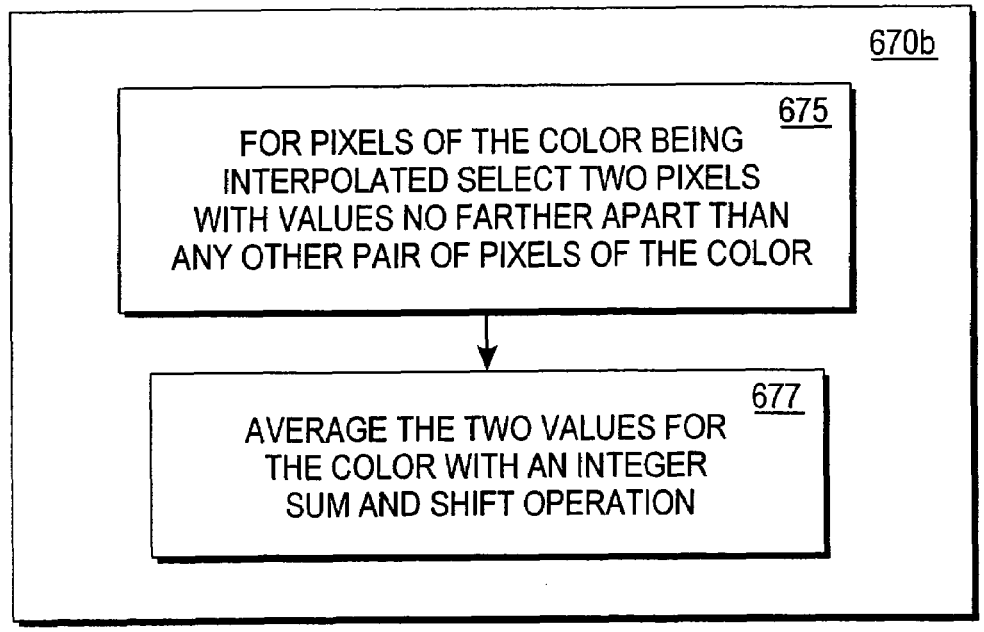

FIG. 6E shows another embodiment 670b of directed linear interpolation that may be used as the short-scale interpolation on the subset array. In step 675, the two pixels in the subset for the color being interpolated are selected that have the closest values or, at least, are no further apart than any other pair of pixels in the subset of that color. In step 677, these two values are averaged together.

This method recognizes that the method of FIG. 6D may not give satisfactory results if there are two or more pixels on the minority side of the edge, because tossing out the greatest and least then still leaves pixels on both side of the edge being averaged together. This method is based on the observation that where more than one pixel is on one side of the edge, that side is best represented at the target pixel. In this case, the two pixels closest in value are probably on the same side of the edge. This method also works if there are multiple pixels on both side of the edge or the pixels are equally divided across both side of the edge. This method does not require determining which side of the edge is the majority side, or where the edge is compared to the target pixel, as long as the target receives a value averaged from the same side of the edge. This method also has the advantage of averaging two values.

The foregoing methods also take advantage of efficiencies in carrying out binary operations. In binary arithmetic a divide by two is equivalent to shifting the binary digits one place, and this is much more efficient than performing a full floating point division. Thus the averaging method can compute an average with an integer sum followed by a binary shift, two relatively efficient operations. Further, the "throwing out the highest and lowest pixel and dividing the remaining two by two" method also ends with a divide by 2 operation and may employ the shifting of the summation by one digit to the right. Arranging multiplication and division operations to use either powers of two, or short sums of powers of two, enables such operations to be accomplished by shifts and adds.

In this context, "short sums of powers of two" means that the term can be decomposed into a few different powers of two (usually no more than 3 or 4). For instance, in the expression "18=16+2", the "16" term and the "2" term are processed separately by shifting, and the results are added together to get the true "18" term.

Figure 6F:
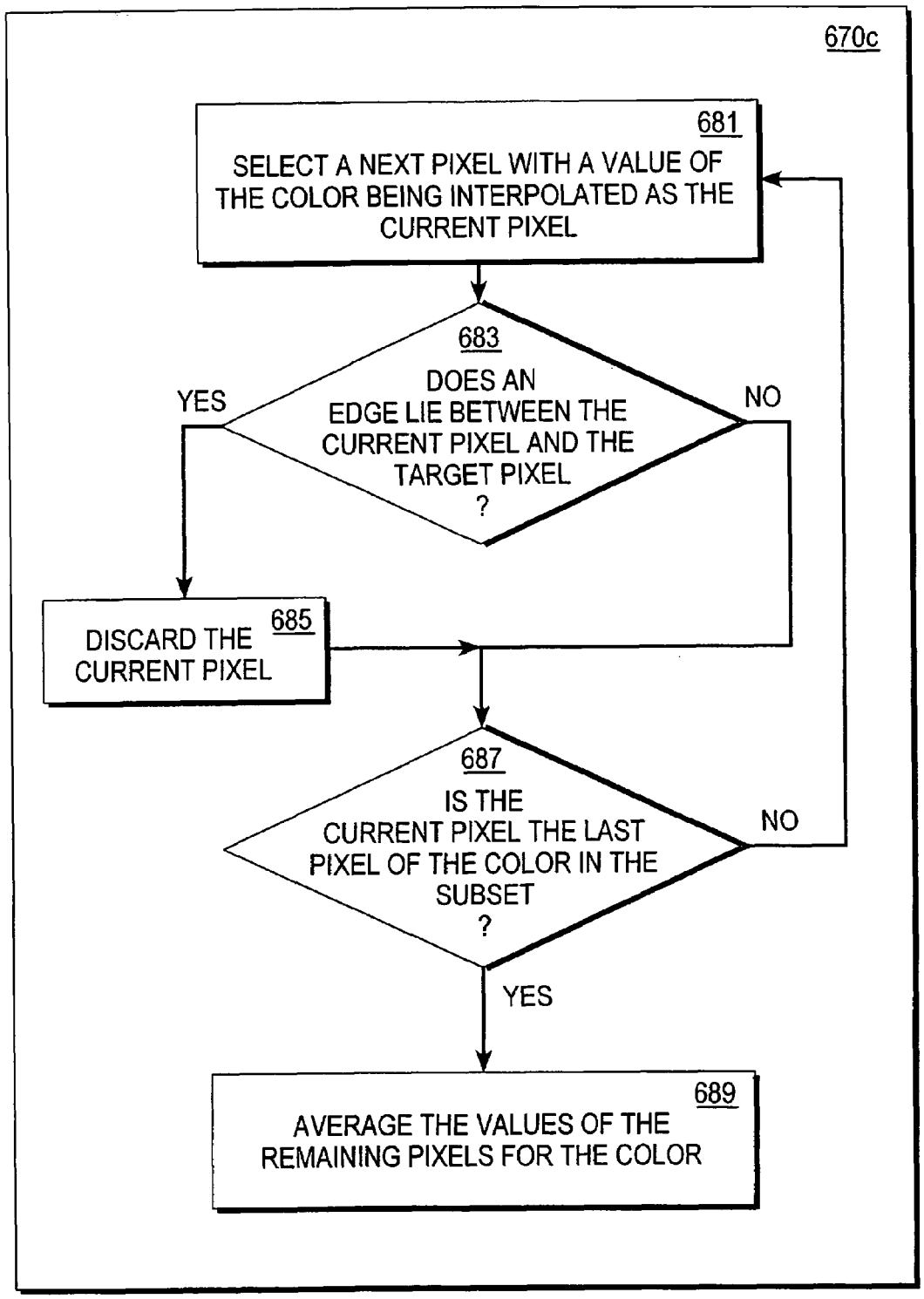

Neither of these methods guarantees all the pixels on the same side of the edge as the target pixel are being averaged to obtain the interpolated color at the target pixel. FIG. 6F shows another alternative embodiment 670c of directed linear interpolation. In step 681, each pixel of the color being interpolated is selected, and it is determined, in step 683, whether that pixel is on the same side of the edge as the target pixel by checking whether an edge lies between the pixel and the target pixel. An inference can be made where the edge is by ranking the pair of pairs of pixels by absolute value computed during edge detection. For example, if the corner pair involving pixels 541 and 549 and the column pair involving pixels 542 and 548 have large absolute values, while the opposite corner pair and the row pair have small absolute values, then the edge is above the target pixel. In this case the last row of the subset and the last column of the subset are on the same side of the edge as the target pixel. If pixel 551 of the subset has a large difference from pixel 559, then step 683 determines the edge lies between pixel 551 and the target pixel.

If an edge does lie between the current pixel and the target pixel, control flows to step 685 where the pixel, e.g., pixel 551, is discarded.

Flow then goes to step 687 where it is determined whether all the pixels of this color in the subset have been checked. If not, flow returns to step 681 to make the next pixel of the color in the subset the current pixel under consideration. If the current pixel is the last, flow control passes to step 689 where the pixels that have not been discarded are averaged together.

If it is determined in step 683 that an edge does not lie between the current pixel and the target pixel, control passes directly to step 687 where it is determined whether all the pixels of the color in the subset have been checked.

Figure 3A:
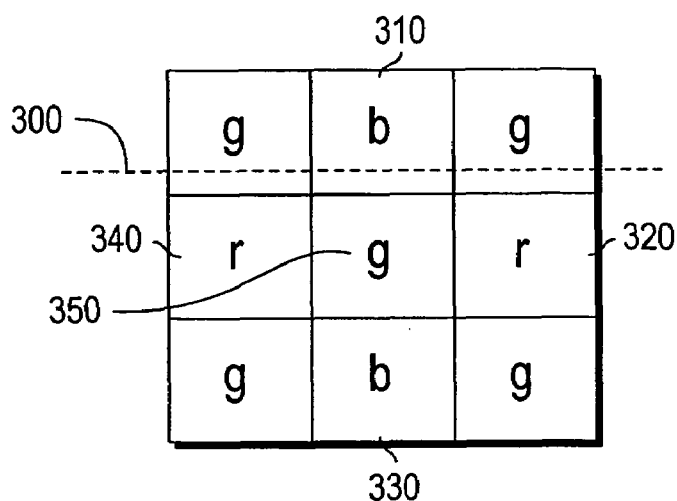
FIG. 3A is a diagram that schematically illustrates a 3×3 section of a color pixel pattern of a sensor, the corresponding values of which may be used to interpolate missing color information for a green pixel.
Figure 3B:
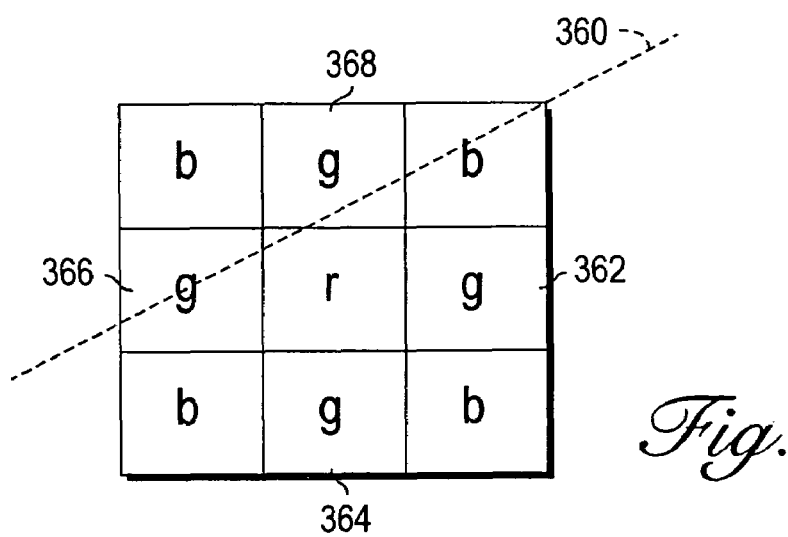
FIG. 3B is a diagram that schematically illustrates a 3×3 section of a color pixel pattern of a sensor, the corresponding values of which may be used to interpolate missing color information for a red pixel.
Figure 3C:
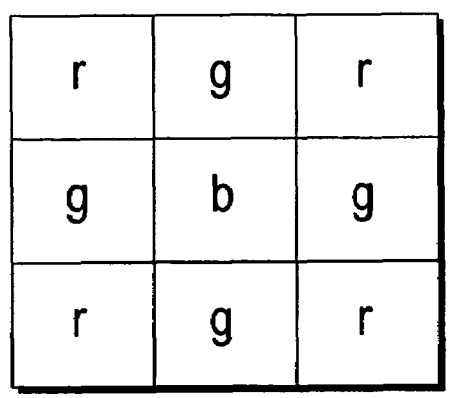
FIG. 3C is a diagram that schematically illustrates a 3×3 section of a color pixel pattern of a sensor, the corresponding values of which may be used to interpolate missing color information for a blue pixel.

FIGS. 3A-C are diagrams that schematically illustrates a 3×3 subset for the three different colors occupying the target pixel. The values in these three subsets are used to interpolate missing color information for a particular pixel using directed linear interpolation. In a 3×3 matrix implementation, there are six permutations of computations that may be performed to form a complete RGB cell. The first two are when a green pixel is the target pixel. One of these two permutations is when blue is being interpolated to the target pixel and the second is when red is being interpolated. The second two permutations are when a red pixel is the target pixel; one permutation each for the other two colors to be interpolated. The last two permutations are when a blue pixel is the target pixel, and each of the other two colors are being interpolated to the target pixel. It turns out that two of the six permutations are processed identically to another two, so that only four combinations of pixels in the subset need to be defined to perform directed linear interpolation for all circumstances for this example.

Referring to FIG. 3A, when a green pixel is the target pixel, the corresponding red and blue pixels must be interpolated. If it is determined that there is an edge 300 adjacent to the target green pixel 350, then the only available non-green neighbors are two red neighbors and two blue neighbors. When the green pixel is the target pixel and the blue value is to be interpolated (at green, calculating blue), the available blue pixels in the 3×3 matrix are a blue pixel 310 and a blue pixel 330. In one embodiment, the mean of the blue pixel 310 value and the blue pixel 330 value is calculated to arrive at the interpolated blue value. In another embodiment, only the value on the correct side of the edge is used. Here the blue pixel 330 is on the same side of the edge 300 as the target pixel 350, and blue pixel 310 is on the opposite side of the edge 300. Accordingly, the blue pixel 310 value is thrown out, to avoid averaging across the edge, and the blue pixel 330 value is used as the interpolated blue value.

Similarly when "at green, calculating red" the mean of the red pixel 320 value and the red pixel 340 value is calculated to arrive at the interpolated red value. In an embodiment where only values from the correct side of the edge are used, both red pixel 320 and red pixel 340 are on the same side of edge 300 as green pixel 350. Therefore the interpolated red value will equal the mean of the two values for pixel 320 and pixel 340.

Referring to FIG. 3B, "at red, calculating green and blue," and FIG. 3C, "at blue, calculating red and green," there are more values, and therefore more options, available for interpolation than in the "at green, calculating red and blue" situation. Referring to FIG. 3B, in the "at red, calculating green" scenario, there is an edge 360, and four green values available for interpolation at green pixel 362, green pixel 364, green pixel 366 and green pixel 368. In an embodiment, the highest value of the four green pixels and the lowest value of the four green pixels are not used because one of the highest and the lowest values has the highest probability of being from opposite side of the edge from the target red pixel. The mean of the remaining two green values is used to interpolate the green value. This means, for example, that if above the edge 360 is a bright region, the highest green value is going to be represented by green pixel 368. The lowest value will therefore reside among the remaining three green pixels, green pixel 320, green pixel 364 and green pixel 362. Throwing out the lowest value of these remaining three pixels will ensure that both pixels with the greatest probability of coming from opposite sides of the edge will be discarded. However, as described above, throwing out the highest and lowest values for pixels of a color does not guarantee the remaining pixels are on the same side of the edge. Note that this method is not available, where the target pixel is a green pixel, because throwing out the highest and lowest red pixels will leave no red pixels. Similarly, throwing out the highest and lowest blue pixels when the target pixel is a green pixel, leaves no blue pixels.

Referring to FIG. 3C, "at blue, calculating green and blue," the circumstances are analogous to those discussed where red is the target pixel. Thus combining pixels for these two permutations are already covered above, leaving just four permutations for combining pixels in directed linear interpolation.

Interpolation Circuit Architecture

1. Structure

Figure 7A:
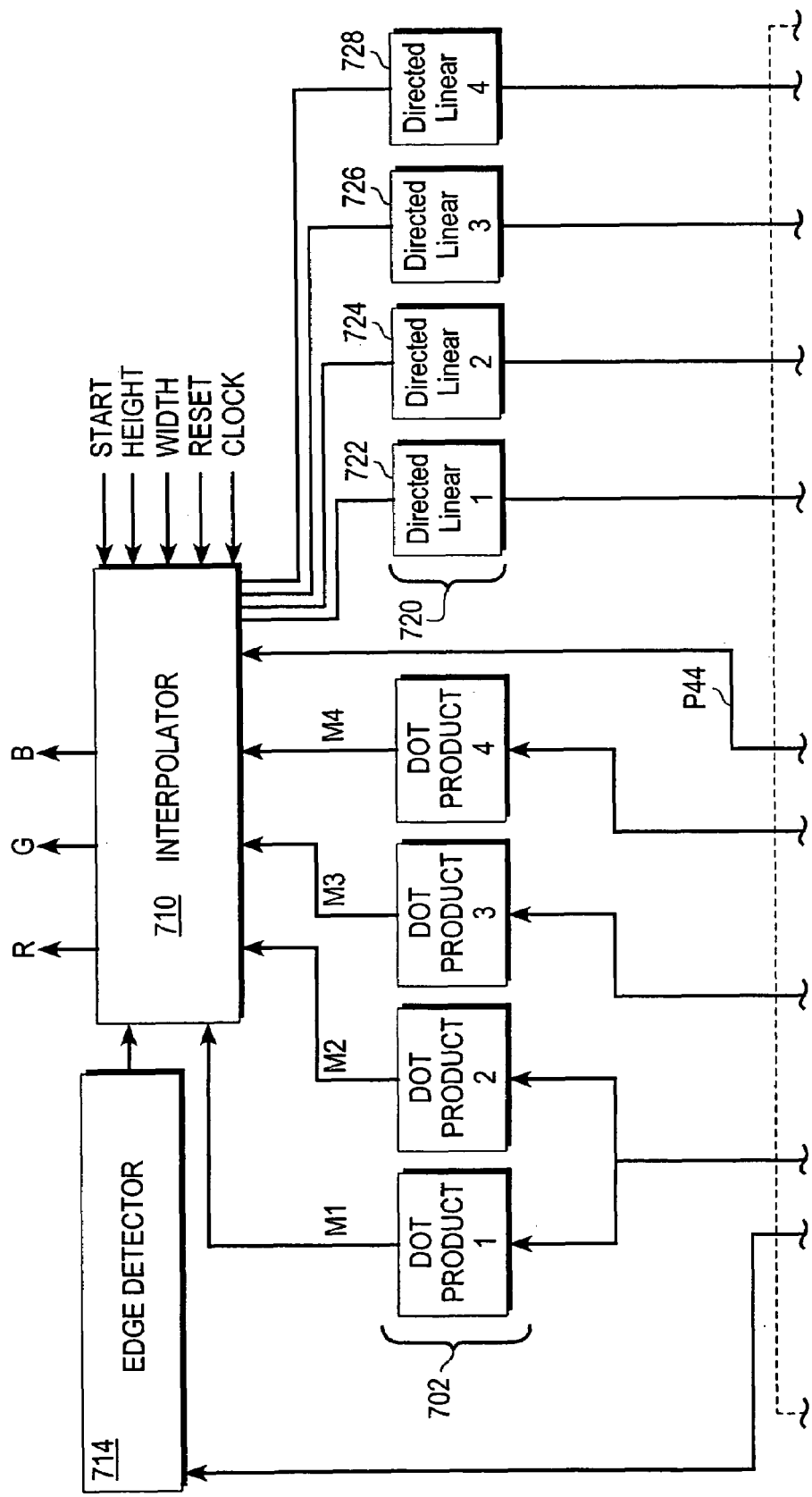
FIG. 7 is a block diagram of an embodiment of an image interpolation circuit.
Figure 7B:
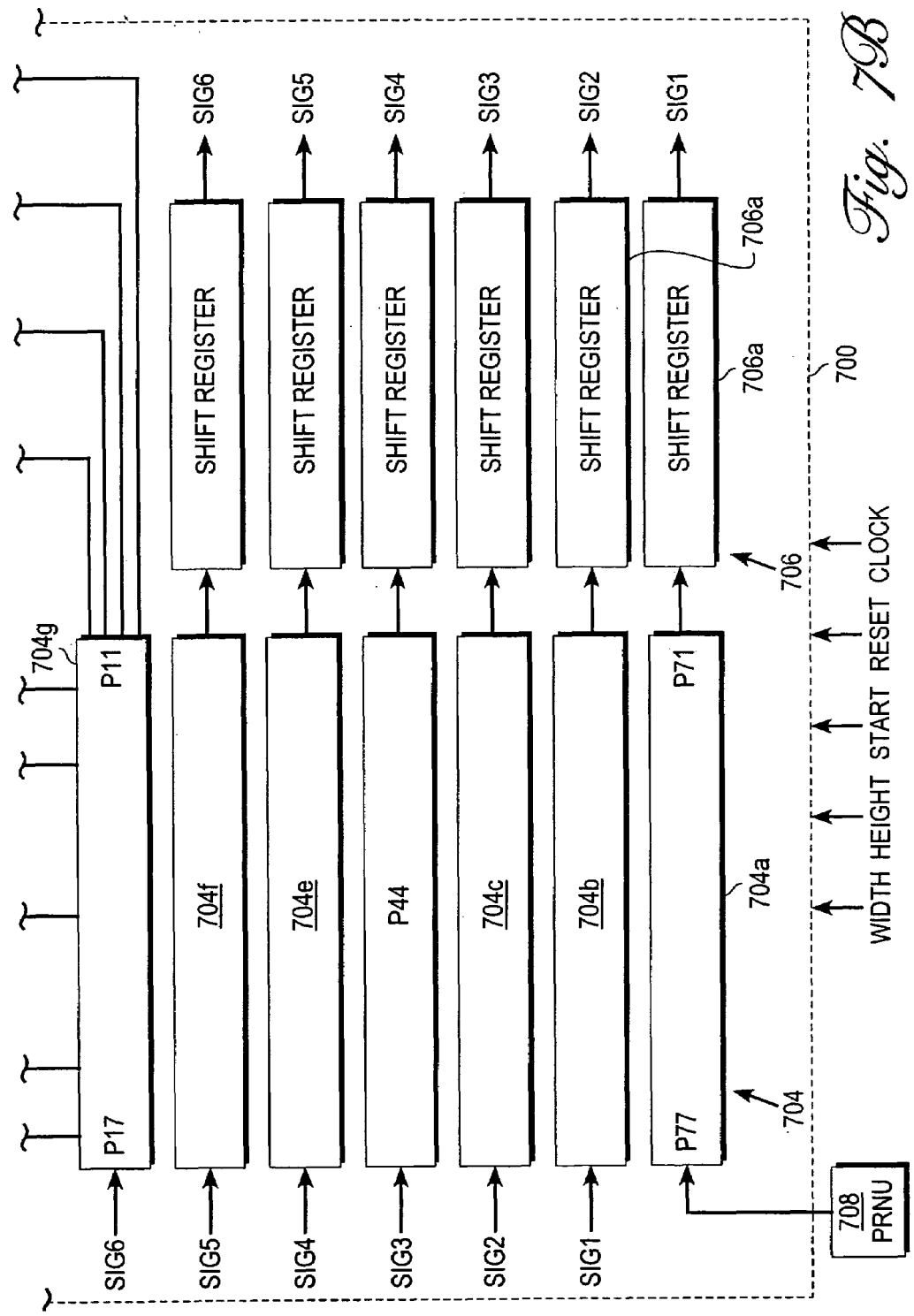

FIG. 7 is a block diagram of an embodiment of an architecture for an electronic circuit or a semiconductor device that may carry out image interpolation. In an embodiment, the architecture disclosed herein may form a part of one or more integrated circuits that make up a digital camera. For example, the architecture of FIG. 7 may form a part of the photo processor 208 of FIG. 2. The architecture may be implemented in a field programmable gate array (FPGA) chip or in an application-specific integrated circuit (ASIC) for a digital camera application.

Generally, the architecture comprises a storage module 700, dot product modules 702, edge detection module 714, short-scale interpolators, such as directed linear modules 720, and interpolator module 701. Storage module 700 generally comprises a register array 704 serially coupled to a plurality of shift registers 706. Register array 704 may comprise a 7-by-7 matrix of registers organized in seven lines 704a, 704b, 704c, etc. Each register is designated in FIG. 7 with a reference numeral in the range P11 to P77 that corresponds to the reference numerals of FIG. 5. Each register stores a pixel value, such as an 8-bit quantity, 12-bit quantity, etc.

The size of the register array 704 corresponds to the number of values that are needed by other elements of the system to carry out image interpolation, i.e., the register array comprises the local array. In this example, a 7-by-7 matrix is shown because it corresponds to a bicubic interpolation approach that uses a 7-by-7 matrix of neighbor pixel values that surround a pixel of interest. However, any other size of matrix maybe used.

Six of the register lines, namely register lines 704a-704f, are linearly coupled to corresponding shift registers 706a-706f. Each shift register 706a-706f comprises a plurality of buckets, in which each bucket that corresponds to one value of the sensor array. Thus, each shift register in its entirety corresponds to one line of pixel values that are received from the sensor array. Each shift register may be implemented as a linear set of registers, in which the number of registers is as large as the largest expected CCD sensor line. Typically, each shift register comprises 1024 to 3000 individual registers, each of which can store an 8-bit value or a 12-bit pixel value. The particular structure is not critical. In an alternate embodiment, each shift register is structured as the number of pixels in a line of the sensor, less 7.

Each of the shift registers 706a-706f generates an output signal SIG1, SIG2, etc. that coupled to an input of a corresponding next higher register line of the register array 704. For example, output signal SIG1 of the first shift register 706a is coupled to a corresponding input of the second register line 704b of register array 704. Likewise, output signal SIG2 of second shift register 706b is coupled to input SIG2 of third register line 704c.

The signals SIG1-SIG6 indicate that values shifted along the shift registers are automatically moved to the first register in an associated register line. Thus, when a value stored in the last bucket of second shift register 706b is shifted right, the value is automatically moved to and stored in the first register P57 of third register line 704c. Values in the shift registers 706 are shifted as the CLOCK signal is clocked. Thus at each clock cycle, the register array holds all the data for the local array in the vicinity of a target pixel, such as the center pixel in the fourth column of the fourth row of the register array.

Values stored in all registers of register array 704 are coupled to and continuously available to be read by dot product modules 702, edge detector module 714, and directed linear modules 720. In the preferred embodiment, four dot product modules and four directed linear modules 720 are provided, as indicated in FIG. 7 by Dot Product 1, Dot Product 2, Dot Product 3, and Dot Product 4, and by Directed Linear 1, 722, Directed Linear 2, 724, Directed Linear 3, 726, and Directed Linear 4, 728, respectively. Each of the dot product modules 702 and directed linear modules 720 corresponds to one of the four (4) cases or permutations described above in connection with FIG. 3.

The term "dot product" is used to refer to dot product modules 702 only for convenience to generally suggest the function carried out by the modules. An actual dot product operation need not be carried out; equivalent processes may be used. For example, the architecture may be used to implement the bitwise shift and add operations described above.

Preferably, however, only those registers of register array 704 that are needed by a particular dot product module, edge detector module 714, or directed linear module 720 are coupled to that particular module. For example, the preceding description notes that when directed linear interpolation is carried out for a blue or red target pixel, there are four (4) non-zero green neighbor values in the subset that are considered by directed linear interpolation. Accordingly, Directed Linear 1 is coupled by four (4) bundles of lines to the four (4) registers of register array 704 that correspond to the non-zero Green neighbor values that need to be considered by Directed Linear 1. Each bundle of lines comprises one line for each bit of a stored value, for example, 8 lines for 8-bit values, 12 lines for 12-bit values, etc.

Similarly, Directed Linear 2 is coupled by four (4) bundles of lines to the four (4) registers of register array 704 that correspond to the non-zero blue or red neighbor values that need to be considered by Directed Linear 2 for a red or blue target pixel, respectively. Directed Linear 3 is coupled by two (2) bundles of lines to the two (2) registers of register array 704 that correspond to the non zero red neighbor values of a green target pixel that need to be considered by Directed Linear 3. Directed Linear 4 is coupled by two (2) bundles of lines to the two (2) registers of register array 704 that correspond to the non-zero blue neighbor values of a green target pixel that need to be considered by Dot Product 2.

Each of the dot product modules 702 produces an output on lines M1, M2, M3, M4, representing a value for one of the two colors that complement the color represented by value P44. Output lines M1-M4 are coupled to Interpolator 710 for use in computing interpolated Red, Green and Blue values. Interpolator 710 also separately receives the value of pixel P44 on a discrete line, since pixel P44 is the center pixel of interest and its value is not used in computations of the dot product modules 702.

Interpolator 710 also receives START, HEIGHT, WIDTH, RESET, and CLOCK signals. The START signal acts as a trigger to notify Interpolator 719 that pixel data has started arriving at register array 704. START is asserted at the same time that the first pixel value arrives at position P77 of the 7-by-7 array. The Interpolator 710 then knows that each clock signal means that one pixel value has shifted across register array 704. Interpolator 710 maintains a pixel counter that is incremented with each clock signal until RESET is asserted. The Interpolator 710 is also wired with a selection mechanism that determines which of the dot product modules 702 to pick depending on the target pixel counter value. Accordingly, the Interpolator can count clock signals and then select the correct two dot product modules 702 for the two colors that are complementary to the color represented by the target pixel P44.

The HEIGHT and WIDTH signals provide the actual height and width, in pixels, of the sensor that is being used. These signals enable Interpolator 710 to determine the color represented by a particular clock pulse, and therefore, which of input lines M1, M2, M3, M4 to select for use in generating R, G, and B values. The RESET signal may be used to reset internal circuitry of Interpolator 710 prior to working on a new image.

Each of the Directed Linear modules 702 produces an output on lines into Interpolator module 710, representing a value for one of the two colors that complement the color represented by value P44 for the target pixel.

Edge Detector module 714 is couple by one or more pairs of bundles to the register array 704a, depending upon which pixels are differenced to determine the gradient. In the preferred embodiment, Edge Detector module 714 is connected by sixteen (16) bundles of wires to pixels 541, 542, 543, 544, 546, 547, 548, 549, 551, 552, 553, 554, 556, 557, 558 and 559 of FIG. 5B, respectively. Edge Detector Module 714 comprises the auto-focus module in another embodiment. The output of the Edge Detector module is a gradient fed into Interpolator module 710.

Based on the gradient from the Edge Detector 714 and a predetermined threshold set and stored in the digital camera, and received by the Interpolator module 710, the Interpolator module 710 determines whether there is an edge in the vicinity of the target pixel P44 555. If not, the Interpolator uses the output of the two dot product modules that give the complementary colors for the color of the target pixel P44 555. If there is an edge, the Interpolator module 710 uses the output of the two directed linear modules that give the complementary colors for the color of the target pixel P44 555. Thus, Interpolator 710 produces, as final output each time that it is clocked, a Red value, Green value, and Blue value on lines R, G, B respectively. The R, G, B values may be fed to another circuit or module for use in generating a digital image.

2. Operation

In operation, corrected pixel data is coupled from a PRNU module 708 to the first register P77 of first register line 704*a* of register array 704. Each register P11-P77 is linearly coupled to the next rightmost register in the register array 704, and operation of the registers is coordinated with a CLOCK signal that is applied to storage module 700. Thus, each time that the storage module 700 is clocked, the value stored in each register is transferred to the next rightmost register. For example, the value in register P77 moves successively to register P76, P75, etc. until it reaches register P71. When the end of a register line 704*a*-704*g* is reached, clocking storage module 700 causes the value in the last register to move to the first register one of the shift registers 706. Thus, the value in register P71 would move the first bucket of shift register 706*a*.

Subsequent clock signals cause each value in a shift register to move successively along the shift register until the last bucket is reached. At that point, in response to a clock signal, a signal SIG1-SIG6 is generated and the value in the last bucket is moved to the first register of the next higher register line. For example, when storage module 700 is clocked, the value stored in the first bucket of shift register 706*a* is moved successively rightward until it reaches the last bucket. The next clock signal causes the value to move to register P67 of register line 704*b*.

When Interpolator 710 receives the START signal, Interpolator 710 then knows that each clock signal means that one pixel value has shifted across register array 704. Interpolator 710 increments its pixel counter with each clock signal. Interpolator 710 determines which of the dot product modules 702 or directed linear modules 720 to use depending on the target pixel color and the gradient provided by the Edge Detector module 714. Those two color values, plus the target pixel color value, become the final Red, Green, Blue values and are clocked to the next module.

The R, G, B outputs of Interpolator 710 are always active. However, only two outputs of the dot product modules or the directed linear modules represented a needed value at any given time, whereas P44 is always one R, G, B component of a pixel. The selection mechanism of Interpolator 710 determines which signal to send to the next module.

General Purpose Computer Hardware Overview

Figure 4:
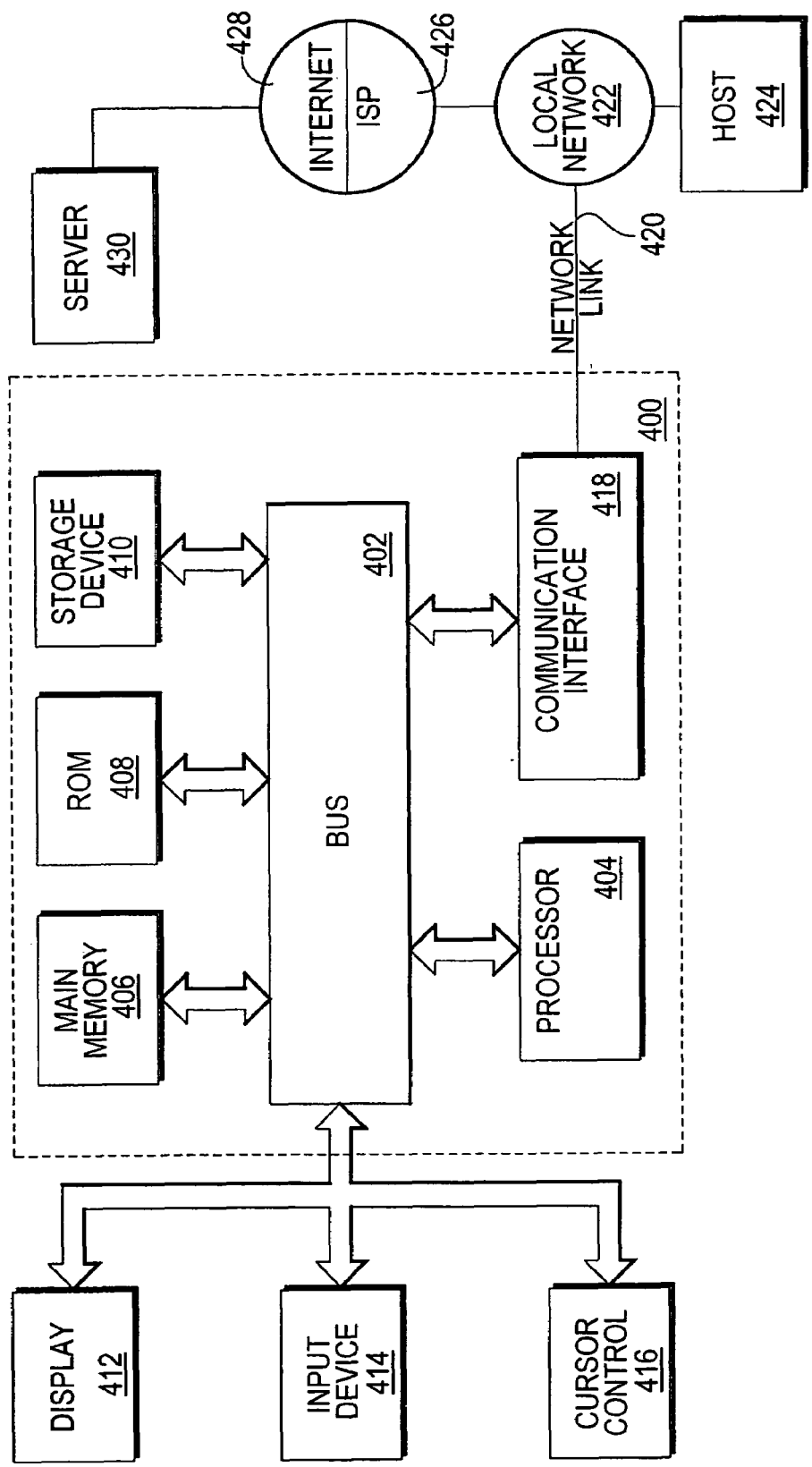
FIG. 4 is a block diagram of a computer system on which an embodiment may be implemented.

FIG. 4 is a block diagram that illustrates a computer system 400 upon which an embodiment may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. - Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for interpolating image information. According to one embodiment, interpolating image information is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for interpolating image information as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for interpolating a color value at a target pixel in a digital image, the method comprising the steps of:
    storing image data values for a portion of a digital image in a vicinity of a target pixel in a local array;
    determining whether there is an edge in the vicinity of the target pixel based on the data values in the local array;
    if there is not an edge in the vicinity of the target pixel, then performing long scale interpolation using image data values in the local array; and
    if there is an edge in the vicinity of the target pixel, then performing short scale interpolation using image data values in a subset of the local array in a closer vicinity of the target pixel.

2. The method of claim 1, the step of determining whether there is an edge further comprising:
    computing an first absolute value of a difference between a first data value at a first pixel in the local array and a second data value at a second pixel in the local array;
    computing a gradient based on the absolute value; and
    if the gradient exceeds a threshold value, then determining that there is an edge in the vicinity of the target pixel.

3. The method of claim 2, the computing the gradient further comprises the steps of:
    computing a second absolute value of a difference between a third data value at a third pixel in the local array and a fourth data value at a fourth pixel in the local array; and
    selecting as the gradient the larger of the first absolute value and the second absolute value.

4. The method of claim 3, wherein the first pixel is in a first column of the local array and the second pixel is in a last column of the local array; and the third pixel is in a first row of the local array and the fourth pixel is in a last row of the local array.

5. The method of claim 3, wherein the first pixel is in a first column of the local array and the second pixel is in a last column of the local array; and the third pixel is in a first column or row of the subset of the local array and the fourth pixel is in a last column or row of the subset of the local array.

6. The method of claim 2, wherein the data value of the first pixel and the data value of the last pixel are for the same color.

7. The method of claim 2, wherein the threshold is a certain percentage of a peak pixel value and the certain percentage is less than 100%.

8. The method of claim 7, wherein the certain percentage is in a range from about 5% to about 40%.

9. The method of claim 7, wherein the certain percentage is in a range from about 10% to about 20%.

10. The method of claim 2, wherein the step of computing a gradient further comprises computing a second absolute value of a difference between a third data value at a third pixel in the local array and a fourth data value at a fourth pixel in the local array; and selecting as the gradient a sum of the first absolute value and the second absolute value; and wherein the threshold is twice a certain percentage of a peak pixel value, and the certain percentage is less than 100%.

11. The method of claim 1, wherein the long scale interpolation is bicubic interpolation.

12. The method of claim 1, wherein the long scale interpolation is implemented as a weighted sum with weights that depend on the color for the image data at the target pixel and the color of the image data being interpolated to the target pixel.

13. The method of claim 12, wherein the weights are powers of two.

14. The method of claim 1, wherein the short scale interpolation is directed linear interpolation comprising the steps of discarding a greatest value and a least value of the image data values for a certain color being interpolated to the target pixel; and averaging the values of the remaining pixels.

15. The method of claim 14, wherein the number of remaining pixels is a power of two.

16. The method of claim 1, wherein the short scale interpolation is directed linear interpolation comprising the steps of selecting two pixels with values no further apart than the values of any other pair of pixels for a certain color being interpolated to the target pixel; and averaging the values of the two pixels.

17. The method of claim 1, wherein the short scale interpolation is directed linear interpolation comprising the steps of discarding a certain pixel, if a location of the edge determined to be present lies between the certain pixel and the target pixel; and averaging the values of the remaining pixels.

18. A computer readable medium carrying one or more sequences of instructions for interpolating a color value at a target pixel in a digital image, which instructions, when executed by one or more processors, cause the one or more processors to carry out the steps of:

storing image data values for a portion of a digital image in a vicinity of a target pixel in a local array;

determining whether there is an edge in the vicinity of the target pixel based on the data values in the local array;

if there is not an edge in the vicinity of the target pixel, then performing long scale interpolation using image data values in the local array, and if there is an edge in the vicinity of the target pixel, then performing short scale interpolation using image data values in a subset of the local array in a closer vicinity of the target pixel.

* * * * *

UNITED STATES PATENT AND TRADEMARK OFFICE
CERTIFICATE OF CORRECTION

PATENT NO. : 7,283,663 B2  Page 1 of 1
APPLICATION NO. : 10/763608
DATED : October 16, 2007
INVENTOR(S) : Sobel et al.

It is certified that error appears in the above-identified patent and that said Letters Patent is hereby corrected as shown below:

Column 19, line 58, in Claim 1, delete "," and insert -- ; -- , therefor.

Column 20, line 66, in Claim 16, delete "further" and insert -- farther --, therefor.

Signed and Sealed this

Twenty-fifth Day of December, 2007

JON W. DUDAS
*Director of the United States Patent and Trademark Office*